US008690370B2

(12) United States Patent
Ayres

(10) Patent No.: US 8,690,370 B2
(45) Date of Patent: Apr. 8, 2014

(54) AUDIO MIXING CONSOLE

(75) Inventor: Richard Ayres, Stevenage Herts (GB)

(73) Assignee: Harman Becker Automotive Systems GmbH, Karlsbad (DE)

( * ) Notice: Subject to any disclaimer, the term of this patent is extended or adjusted under 35 U.S.C. 154(b) by 215 days.

(21) Appl. No.: 13/000,321

(22) PCT Filed: Jun. 19, 2009

(86) PCT No.: PCT/EP2009/004446
§ 371 (c)(1),
(2), (4) Date: Mar. 14, 2011

(87) PCT Pub. No.: WO2009/153055
PCT Pub. Date: Dec. 23, 2009

(65) Prior Publication Data
US 2011/0188260 A1    Aug. 4, 2011

(30) Foreign Application Priority Data

Jun. 19, 2008   (EP) ..................................... 08011209

(51) Int. Cl.
*F21V 33/00* (2006.01)
*F21V 7/04* (2006.01)
(52) U.S. Cl.
USPC .............. 362/85; 362/253; 362/551; 362/552
(58) Field of Classification Search
None
See application file for complete search history.

(56) References Cited

U.S. PATENT DOCUMENTS

| 7,366,313 | B2 * | 4/2008 | Kato | ............................. 381/119 |
| 7,682,044 | B2 * | 3/2010 | Huber | ........................... 362/253 |
| 2004/0066943 | A1 | 4/2004 | Kato | |
| 2007/0182864 | A1 | 8/2007 | Stoneham et al. | |
| 2007/0274062 | A1 | 11/2007 | Huber | |

FOREIGN PATENT DOCUMENTS

| DE | 100 14 221 A1 | 10/2011 |
| EP | 1 777 609 A1 | 4/2007 |

OTHER PUBLICATIONS

PCT Written Opinion of the International Searching Authority, International Application No. PCT/EP2009/004446, Mailed Dec. 19, 2010, 6 pages.
Extended European Search Report, EP Application No. 08011209.7-1224, Mailed Apr. 22, 2009, 6 pages.

* cited by examiner

*Primary Examiner* — Natalie Walford
(74) *Attorney, Agent, or Firm* — Brooks Kushman P.C.

(57) ABSTRACT

A control module having a plurality of control elements configured to control a first function of the control module in a first operating mode and another function of the control module in another operating mode of the control module. The control elements are grouped into different groups of control elements. Each group of control elements corresponds to a predetermined group of functions of the control module. The grouping is dependant on the operating mode of the control module. An illumination system provides illuminated control-dividing surfaces that visually separate one group of control elements from another group of control elements. The illumination system illuminates the control-dividing surfaces according to the grouping of the control elements and according to the operating mode.

16 Claims, 6 Drawing Sheets

AUDIO MIXING CONSOLE

CROSS-REFERENCE TO RELATED APPLICATIONS

This application is filed under 35 U.S.C. §371 as International Application No. PCT/EP2009/004446, filed Jun. 19, 2009, titled AUDIO MIXING CONSOLE, which claims priority to European Application Serial No. EP 08 011 209.7, filed on Jun. 19, 2008, titled AUDIO MIXING CONSOLE, the entirety of which application is incorporated by reference into this application.

BACKGROUND OF THE INVENTION

1. Field of the Invention

This invention relates to control modules having a plurality of control elements, and more particularly to audio mixing consoles.

2. Related Art

Control modules are typically included as components in systems that operate under the control of users. A control module may receive different signals with a variety of signal parameters. Control elements are included on the control module to provide a user with devices configured to control the signal parameters. One example of a control module is an audio mixing console.

Audio mixing consoles are used in audio systems for applications that may include multi-track recording, broadcast, post production, live sound reinforcement and stage monitoring. The sound signal from microphones, electronic musical instruments or other sound sources enters the mixing console, which amplifies the signals from the sound sources as needed. The mixing console allows the operator to mix, equalize, and add effects to the signals according to the requirements of the installation. The operator controls the different function of the audio mixing console using a plurality of control elements often configured as rotary buttons. Different features of a sound signal may be controlled using the control elements. The number of desired features may be large, which corresponds to a large number of control elements often mounted on a console having limited space. The number of different control elements on the mixing console may be limited by controlling different functions of the audio mixing console using one control element. In one operating mode, a control element is used for adjusting one feature of the recorded audio signal or of the mixing console while in another operating mode, the same control element is used to adapt another feature of the audio signal or of the mixing console. Several control elements may be grouped to a group of control elements such that each group controls a predetermined function of the audio signal. In such an implementation, the grouping of control elements would also depend on the selected operating mode of the mixing console. The operator may experience difficulty in identifying where one group of control elements ends and where another group begins.

The complexity created by a large number of control elements operating in groups is not limited to audio mixing consoles. Any control module having a plurality of control elements that may be used to control different features in different operating modes would present itself as confusingly complex to a user.

A need exists for a control module that allows a user to use control elements that operate in different modes without encountering difficulty from undue complexity.

SUMMARY

In view of the above, a control module having a plurality of control elements is provided. The control elements are configured to control a first function of the control module in a first operating mode and another function of the control module in another operating mode of the control module. The control elements are grouped into different groups of control elements. Each group of control elements corresponds to a predetermined group of functions of the control module. The grouping into groups is dependant on the operating mode of the control module. An illumination system provides illuminated control-dividing surfaces that visually separate one group of control elements from another group of control elements. The illumination system illuminates the control-dividing surfaces according to the operating mode of the control module.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The description below may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
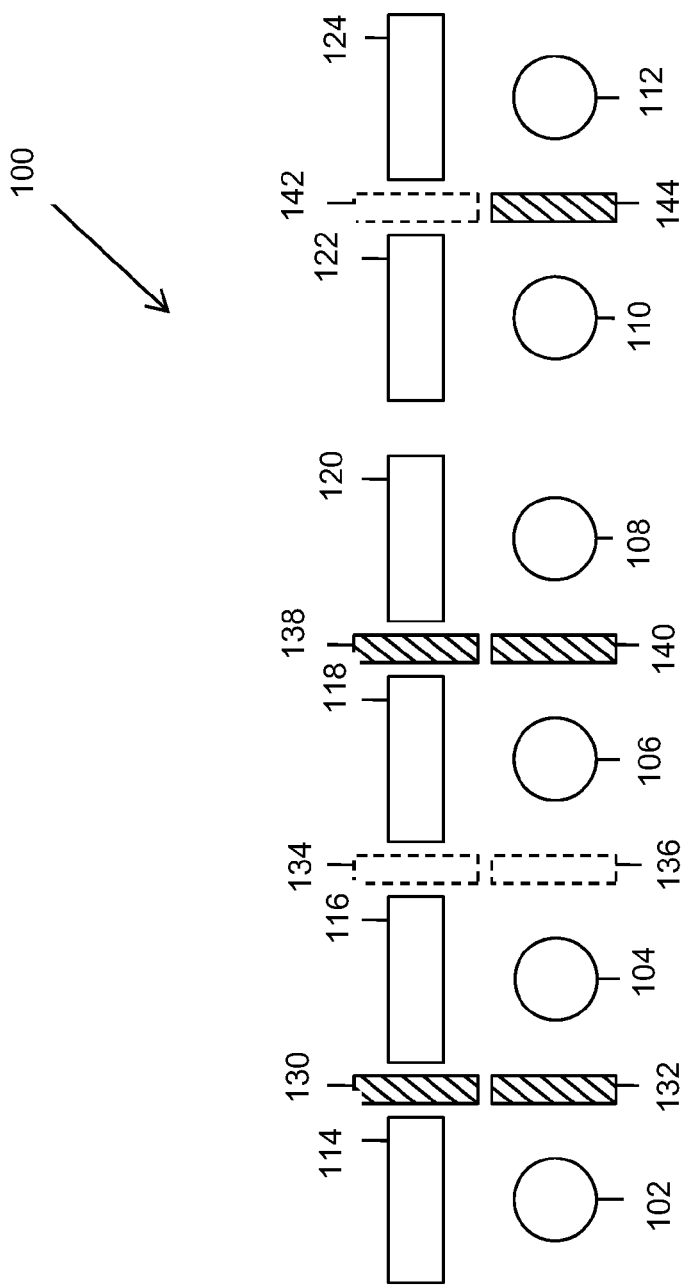
FIG. 1 is a schematic diagram of an example of a control module surface with different control elements and control-dividing surfaces separating different groups of control elements.

FIG. 1 is a schematic diagram of an example of a control module surface 100 with different control elements and control-dividing surfaces separating different groups of control elements. The example control module 100 in FIG. 1 is a described here as being an audio mixing console for purposes of illustration. Any other type of control module 100 may be used instead. The mixing console 100 includes a plurality of control elements. In the example shown in FIG. 1, the mixing console 100 includes six different control elements 102, 104, 106, 108, 110, 112. The mixing console 100 also includes a plurality of display elements 114, 116, 118, 120, 122, 124, one display element for each control element 102, 104, 106, 108, 110, 112. The display elements 114, 116, 118, 120, 122, 124 provide an indication of the function being controlled by the respective control element 114, 116, 118, 120, 122, 124. For example, if the mixing console 100 is operating in an equalizer mode, the display element 114 may indicate that the control element 102 controls the adjusted gain for each sub band. It is to be understood that the display elements 114, 116, 118, 120, 122, 124 are optional.

The mixing console 100 also includes at least one control-dividing surface between pairs of control elements. For example, control-dividing surfaces 130, 132 are positioned between the control element 102 and the control element 104. The mixing console 100 in FIG. 1 includes control-dividing surfaces 130, 132, 134, 136, 138, 140, 142, 144. The control-dividing surfaces 130, 132, 134, 136, 138, 140, 142, 144 may be illuminated by a light source (not shown in FIG. 1). An example of a light source that may be used is a light emitting diode (LED).

The control-dividing surfaces 130, 132, 134, 136, 138, 140, 142, 144 visually separate one group of control elements from another group of control elements. For example, a first group of control elements may include the control element 102, which may be used for adjusting a first predetermined function or parameter of the mixing console 100 or of the audio signal being mixed by the mixing console 100. A second group may include the control elements 104 and 106. A third group may include the control elements 108, 110 and 112. The control-dividing surfaces 130, 132, 134, 136, 138, 140, 142, 144 may be illuminated according to how the control elements are separated into groups. In the example shown in FIG. 1, a first group of control elements includes the control element 102. The two control-dividing surfaces 130 and 132 are positioned adjacent to each other and indicate a boundary between the first group and another group.

A second group, which includes the control elements 104 and 106, begins on the opposite side of these control-dividing surfaces 130, 132. The control-dividing surfaces 130, 132 are shaded in FIG. 1 to indicate that the control-dividing surfaces 130, 132 are illuminated. The control-dividing surfaces 134, 136 are positioned between control elements 104 and 106. The control elements 104 and 106 are shown in dashed lines to indicate that these control-dividing surfaces 134, 136 are not illuminated since the control elements 104 and 106 are in the same group.

The second group of control elements 104 and 106 is separated from the next group by a boundary formed by the control-dividing surfaces 138 and 140. The control-dividing surfaces 138 and 140 are shaded to indicate that they are illuminated, which again indicates a group boundary to the operator. In the example shown in FIG. 1, a third group includes the control elements 108, 110 and 112, which further includes two subgroups. A first subgroup includes the control elements 108 and 110, and another subgroup includes the control element 112. In order to indicate to the operator that there is a sub-dividing of one group, only the control-dividing surface 144 in the pair of control-dividing surfaces 142, 144 is illuminated. The other control-dividing surface 142 in the pair of control-dividing surfaces 142, 144 is not illuminated.

The indication of group boundaries by illumination of the pair of control-dividing surfaces and the indication of sub-group boundaries by illumination of one of the pair of control-dividing surfaces provides the user with an image that clearly depicts which control elements are grouped and which are sub-grouped. For example, the control-dividing surfaces 130, 132, 138, 140, 144 that are illuminated and the control-dividing surfaces 134, 136, 142 that are not illuminated on the mixing console 100 as shown in FIG. 1 provides a clear visual image indicating to the operator that the control elements 102 to 112 are grouped into three different groups and that one of the groups contains two different subgroups. The pairs of adjacent control-dividing surfaces 130 and 132, 138 and 140, 142 and 144 form combined control-dividing surfaces and the control-dividing surface 144 in the combined control-dividing surface formed by control-dividing surfaces 142 and 144 separates two subgroups.

The groups of control elements may be formed functionally, so that a group of control elements may perform similar or related functions and the sub-groups indicate a sub-dividing of the functions. For example, in the context of the mixing console 100, a group of control elements may perform equalization functions and have sub-groups to indicate the equalizing bands. The different operating modes of the mixing console may further add flexibility to the mixing console capabilities. When the operating mode of the mixing console is changed, the grouping of control elements may also change. The illumination of the control-dividing surfaces may then be adapted to the new grouping of the control elements making the boundaries of the groups clear to the operator.

Figure 2:
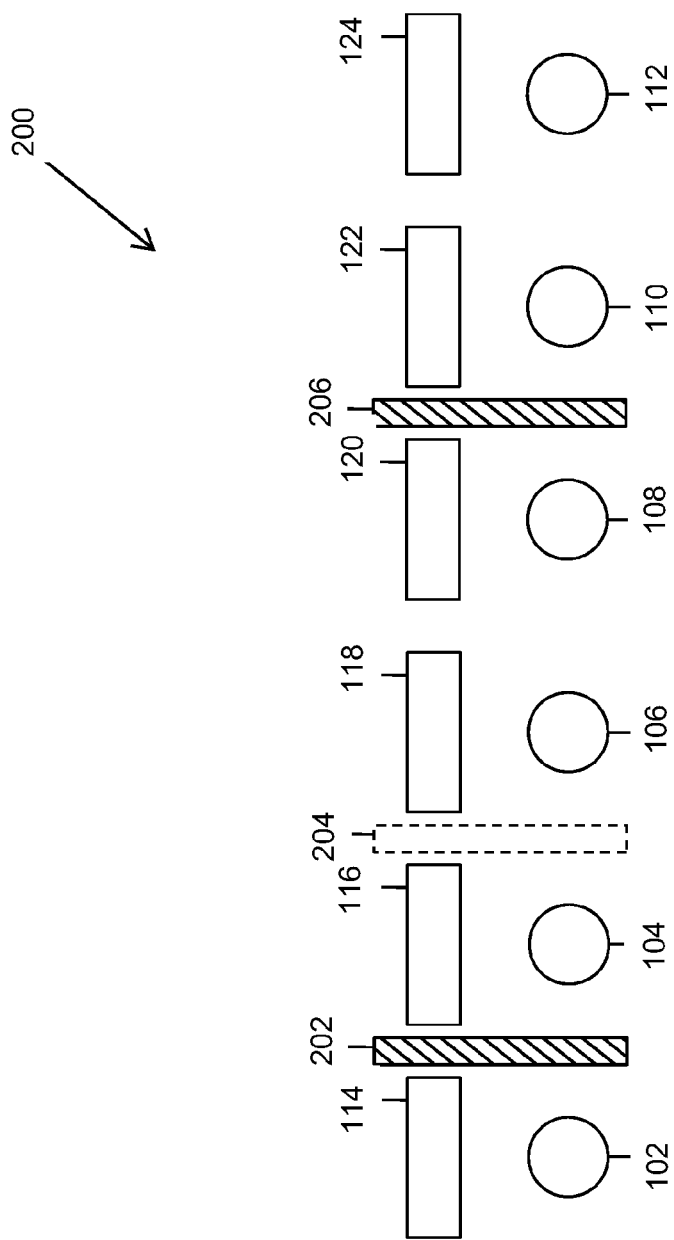
FIG. 2 is a schematic diagram of an example of a control module surface having control-dividing surfaces.

FIG. 2 is a schematic diagram of an example of a control module surface 200 having control-dividing surfaces 202, 204, 206. The control module surface 200 is similar to the mixing console 100 in FIG. 1. The same elements are referenced by the same reference numerals. In the example shown in FIG. 2, the control elements 102, 104, 106, 108, 110, 112 are separated by one-piece control-dividing surfaces 202, 204, 206. The control elements 104, 106, and 108 form one group; the control elements 110 and 112 form another group, and control element 102 forms yet another group. In this example, the control-dividing surfaces 202 and 206 are illuminated in order to more clearly show which group a control element belongs to.

Figure 3:
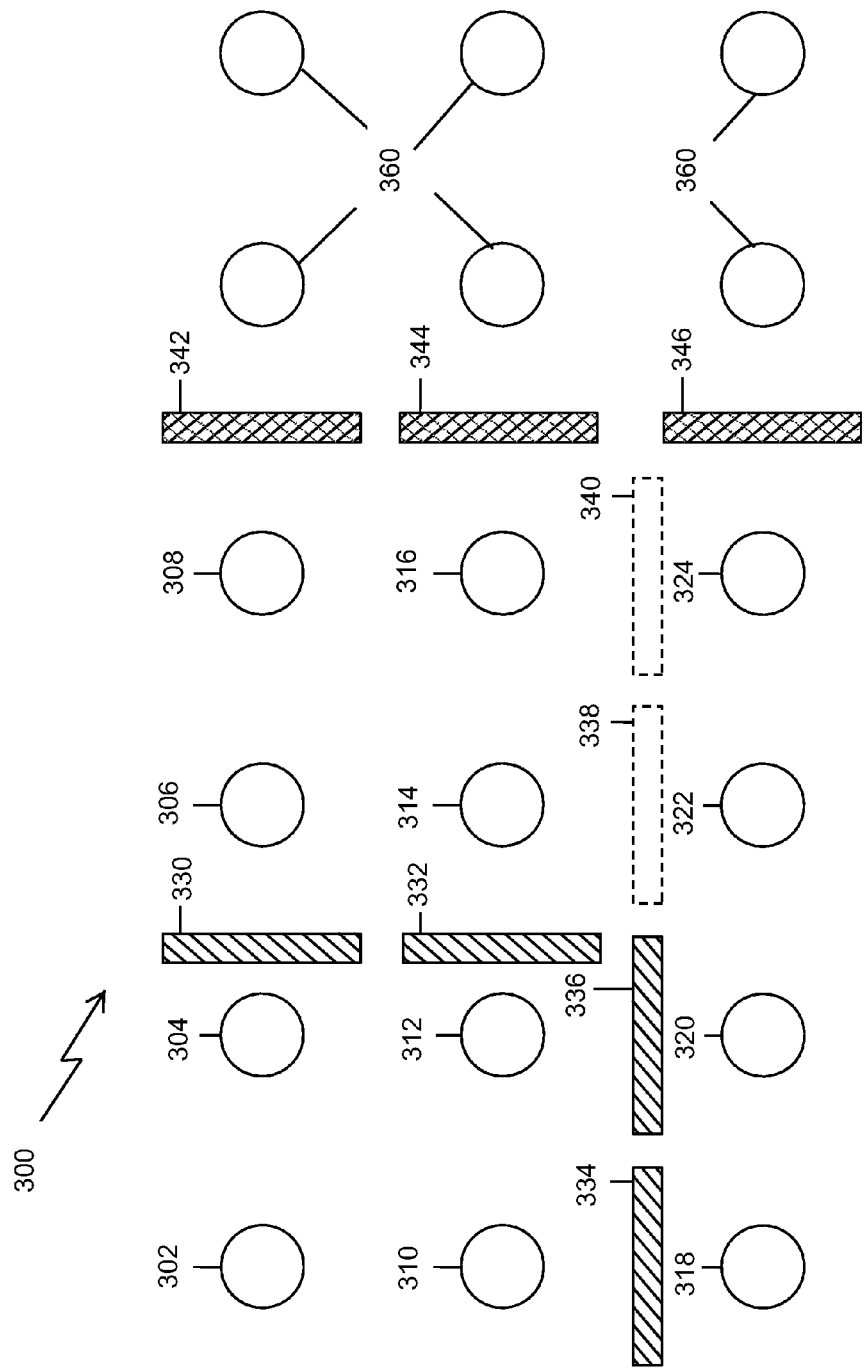
FIG. 3 is a schematic diagram of another example of a control module having control-dividing surfaces.

FIG. 3 is a schematic diagram of another example of a control module 300 having control-dividing surfaces. The control module 300 in FIG. 3 is an example of a mixing console having control elements 302, 304, 306, 308, 310, 312, 314, 316, 318, 320, 322, 324. The control elements 302, 304, 306, 308, 310, 312, 314, 316, 318, 320, 322, 324 in FIG. 3 are positioned in a matrix having a first row of control elements 302, 304, 306, 308, a second row of control elements 310, 312, 314, 316, and a third row of control elements 318, 320, 322, 324. The view in FIG. 3 may show only a portion of the mixing console 100 as shown by the depiction of other control elements 360.

The mixing console 300 includes control-dividing surfaces 330, 332, 334, 336, 338, 340, 342, 344, 346 between the control elements 302, 304, 306, 308, 310, 312, 314, 316, 318, 320, 322, 324. The example in FIG. 3 may illustrate selected control-dividing surfaces for purposes of illustration where control-dividing surfaces are included between each pair of control elements. In the example in FIG. 3, a first group of control elements includes the control elements 302, 304, 310, and 312 and another group includes the control elements 306, 308, 314, 316, 318, 320, 322, 324. Control-dividing surfaces 330, 332, 334, and 336 are illuminated to indicate a boundary between the first and second group of control elements. Control-dividing surfaces 338 and 340 are not illuminated to indicate inclusion of control elements 318, 320, 322, and 324 in the group with control elements 306, 308, 314, and 316. The control-dividing surfaces 342, 344, and 346 form a boundary separating the control elements 308, 316, and 324 from the other control elements 360 and may be illuminated in the same manner as the control-dividing surfaces 330, 332, 334, and 336. However, the control-dividing surfaces 342, 344, and 346 may also be illuminated in another color that is different than that of the control-dividing surfaces 330, 332, 334, and 336 as indicated in FIG. 3 by the different shading in the control-dividing surfaces 342, 344, and 346.

Figure 4:
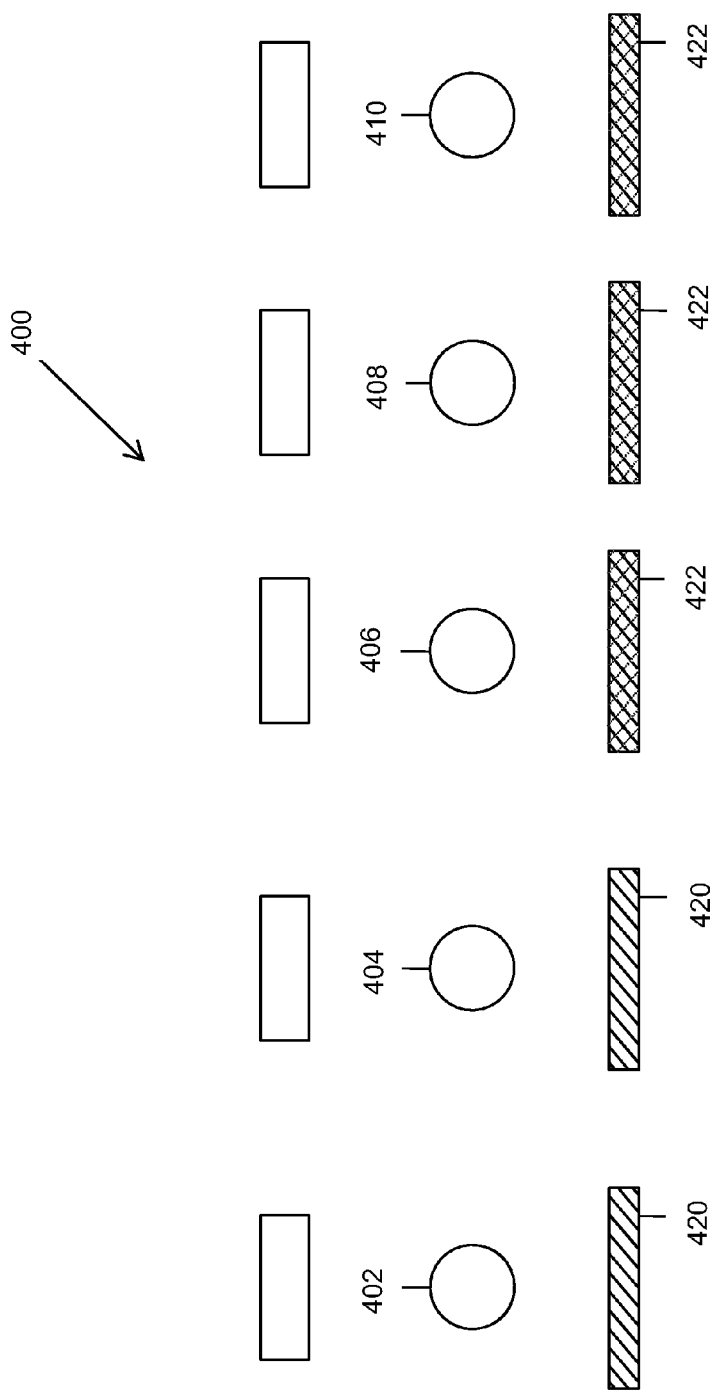
FIG. 4 is a schematic diagram of an example of a part of a control module having control-dividing surfaces.

FIG. 4 is a schematic diagram of an example of a part of a control module 400 having control-dividing surfaces 420, 422. The control module 400 in FIG. 4 illustrates using control-dividing surfaces to group the different control elements together using different colors. The control module 400 in FIG. 4 includes control elements 402, 404, 406, 408, and 410, and sets of control-dividing surfaces 420 and 422. The control-dividing surfaces 420, 422 are used to show which of the control elements are grouped together according to color. The control elements 402 and 404 belong to the same group as indicated by illuminating control-dividing surfaces 420 using the same color. Similarly, the control-dividing surfaces 422 are illuminated in a different color to indicate that these three control elements 406, 408, and 410 belong to another group.

Figure 5:
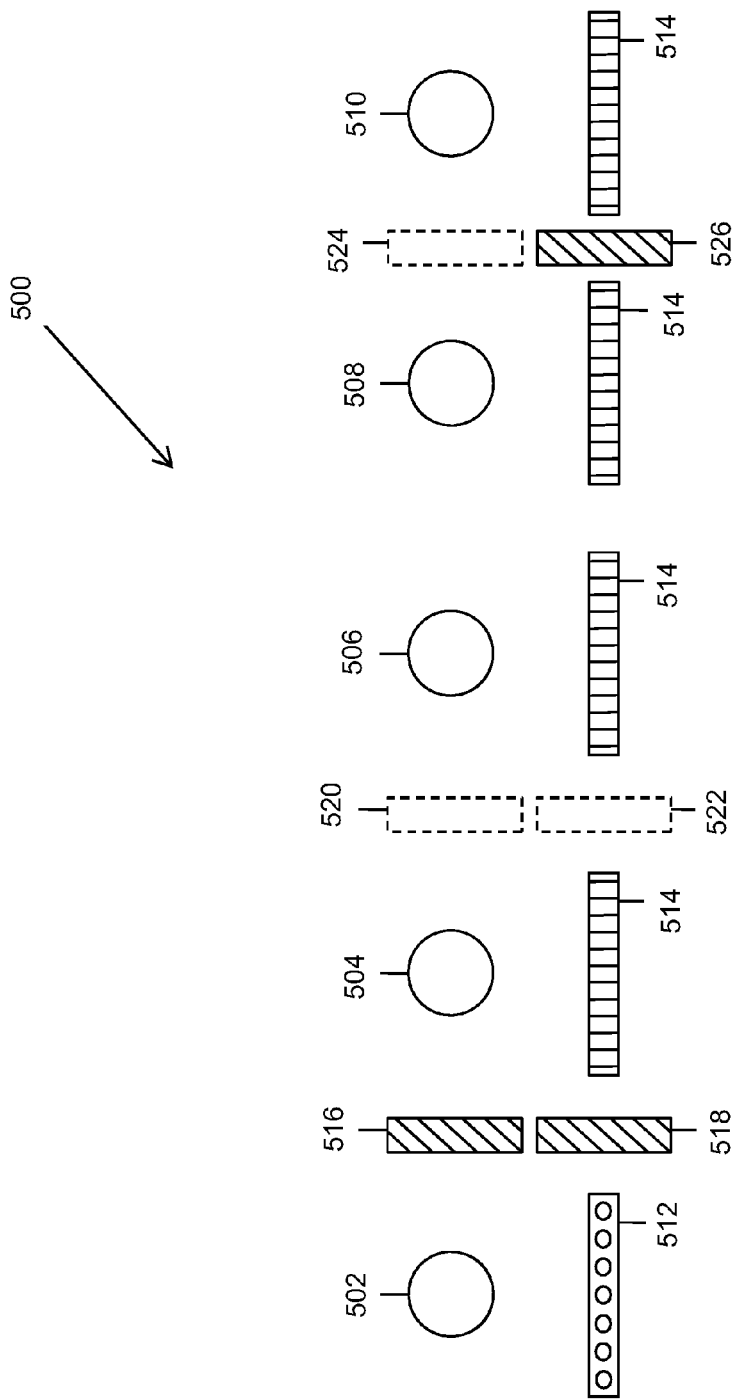
FIG. 5 is a schematic diagram of another example of a control module surface having control-dividing surfaces.

FIG. 5 is a schematic diagram of another example of a control module surface 500 having control-dividing surfaces 512, 514, 516, 518, 520 522, 524, 526. The example control module 500 in FIG. 5 implements a combination of the example shown in FIGS. 1 and 2 with the example shown in FIG. 4. The control module 500 includes control elements 502, 504, 506, 508, and 510. The control element 502 forms one group and control elements 504, 506, 508, and 510 form another group of control elements. The control module 500 includes horizontal control-dividing surfaces 512 and 514, which are shown illuminated in different colors to indicate the group to which the respective control elements belongs. The first horizontal control-dividing surface 512 is illuminated in one color and the other four horizontal control-dividing surfaces 514 are illuminated in another color to indicate that the four corresponding control elements 504, 506, 508, and 510 belong to another group. Vertical control-dividing surfaces 516, 518, 520, 522, 524, and 526 are also provided to provide boundaries between the different groups. For example, the vertical control-dividing surfaces 516 and 518 are illuminated to form a boundary between the control element 502 and the next adjacent control element 504, which belongs to another group. The vertical control-dividing surfaces 520 and 522 are not illuminated to indicate that control element 504 and the next adjacent control element 506 belong to the same group.

The group of control elements shown by the horizontal control-dividing surfaces 514 includes two sub-groups. One sub-group includes control elements 504, 506, and 508, and another subgroup includes the control element 510. Control elements 508 and 510 belong to the same main group and are therefore illuminated by the same color as indicated by the illuminated horizontal control-dividing surfaces 514. The control-dividing surface 526 is illuminated and the control-dividing surface 524 is not illuminated to form a boundary between a sub-group containing control element 508 and the sub-group containing control element 510.

The groupings of control elements illustrated in FIGS. 1-5 show how different groups may be differentiated by illumination of selected control-dividing surfaces. The illumination of groupings may be varied to reflect different groupings when the operating mode of the mixing console is switched to a different operating mode.

Figure 6:
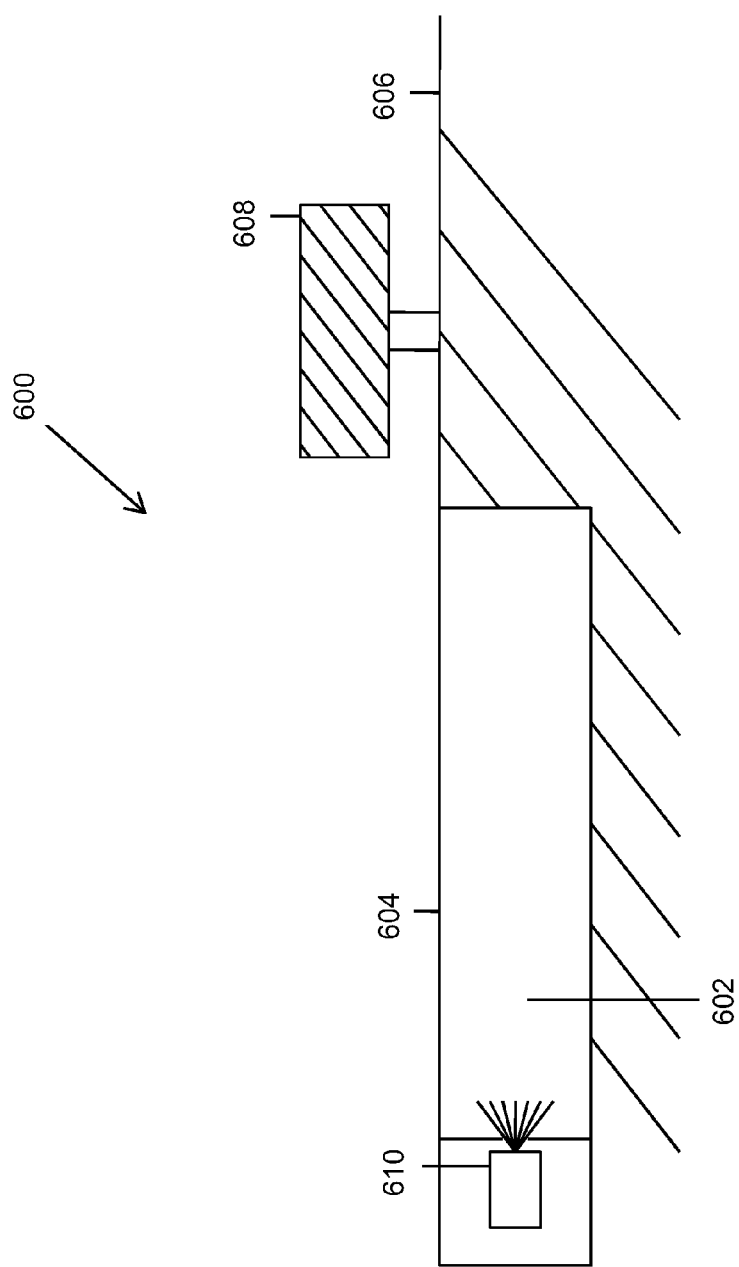
FIG. 6 is a cross-sectional side view of an example of the control-dividing surface.

FIG. 6 is a cross-sectional side view of an example of a control-dividing surface 600 on a mixing console near a control element 608. The control-dividing surface 600 includes a light pipe 602 and a through-hole 604 in the upper surface of the light pipe 602. The light pipe 602 and through-hole 604 may be formed as an elongated control-dividing surface as illustrated in FIGS. 1-5. The through-hole 604 is formed in a control surface 606 of the mixing console 600. The light pipe 602 may be illuminated by a light source 610, which can be located below the light pipe 602 or, as shown in FIG. 6, adjacent to the light pipe 602. The through-hole 604 may be covered by a light-permeable cover such as glass (not shown). The light source 610 may be configured to provide light to illuminate the control-dividing surface 606 in different colors by either using light sources that emit light in different colors or by adding different filters. The colors emitted may conform to the VI6 format.

The control-dividing surface 600 in FIG. 6 is shown to be illuminated by a single light source at light pipe 602. However, a single light source may illuminate some or all of the control-dividing surfaces and opaque covers may be used to cover control-dividing surfaces that are not illuminated in accordance with the desired grouping of control elements.

The above-described examples were described in the context of a mixing console. However, other examples may be used in the context of any other type of control module having a plurality of control elements. For example, example implementations may be in the form of control modules for computer controlled units such as work stations, control modules for power plants, or control modules for airplanes.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A control module comprising:
    a plurality of control elements configured to control a first function of the control module in a first operating mode of the control module, where the control elements are grouped into different groups of control elements, each group of control elements corresponding to a predetermined group of functions of the control module, the grouping into groups depending on the operating mode of the control module; and
    an illumination system to provide illuminated control dividing surfaces that visually separate one group of control elements from another group of control elements, where the illumination system illuminates the control-dividing surfaces according to the operating mode of the control module,
    wherein the illumination system includes a plurality of different control-dividing surfaces to be illuminated separately, and wherein in a case of an operating mode change, the illumination system is configured such that the illuminated control-dividing surfaces are adapted accordingly to represent a new separation of the control elements into different groups, wherein an illuminated control-dividing surface provided between the control elements within the new separation separates one group of control elements from another group of control elements.

2. The control module of claim 1 where each control-dividing surface is illuminated by a light source.

3. The control module of claim 1 where the control-dividing surface is an elongated area in a control surface of the control module where the control elements are provided.

4. The control module of claim 1 where the control-dividing surface is a light pipe with a through hole in a control surface where the control elements are provided.

5. The control module of claim 1 where the control-dividing surfaces form a combined control-dividing surface on a control surface of the control module.

6. The control module of claim 5 where a first group of control elements are separated into at least two subgroups, the subgroups of the first group are separated by one control-dividing surface, and two different groups are separated by the combined control-dividing surface.

7. The control module of claim 1 where the illumination system illuminates the control-dividing surfaces in different colors, each color corresponding to one of the groups of control elements.

8. The control module of claim 1 where the colors conform a Vi6 format.

9. The control module of claim 1 where the control module is an audio mixing console.

10. A method for indicating groups of control elements on a control module having a plurality of control elements comprising:
grouping a first plurality of control elements in a first group and a second plurality of control elements in a second group, the first and second plurality of control elements grouped according to functions in a selected one of a plurality of operating modes of the control module;
illuminating a control-dividing surface between one of the control elements in the first group and an adjacent control element in the second group;
inhibiting illumination of another control-dividing surface between two adjacent control elements in the same group
performing the illuminating and inhibiting illumination steps until the plurality of control elements are grouped within illuminated control-dividing surfaces;
illuminating a plurality of different control-dividing surfaces separately;
adapting the illuminated control-dividing surface accordingly to represent a new separation of the control elements into different groups in the event an operating mode changes; and
providing an illuminated control-dividing surface between control elements within the new separation to separate one group of control elements from another group of control elements.

11. The method of claim 10 where the plurality of control elements are arranged in rows of control elements, the method further comprising:
illuminating a horizontal control-dividing surface between one of the control elements in the first group and an adjacent control element in the second group, the adjacent control element being in a row above or below the control element in the first group;
inhibiting illumination of another horizontal control-dividing surface between two adjacent control elements in the same group, the adjacent control elements being in different rows; and
performing the illuminating and inhibiting illumination steps until the plurality of control elements are grouped within illuminated horizontal control-dividing surfaces.

12. The method of claim 10 where the control-dividing surfaces are divided into two portions, both portions being illuminated to divide groups of control elements and one of the two portions being illuminated to divide sub-groups of control elements within a group of control elements.

13. The method of claim 10 where the control-dividing surfaces are divided into two portions, both portions being illuminated to divide groups of control elements and one of the two portions being illuminated to divide sub-groups of control elements within a group of control elements, the method further comprising the steps of:
illuminating a first group of horizontal control-dividing surfaces corresponding to the first group of control elements using a first color; and
illuminating a second group of horizontal control-dividing surfaces corresponding to the second group of control elements using a second color.

14. A method for indicating groups of control elements on a control module having a plurality of control elements comprising:
grouping a first plurality of control elements in a first group and a second plurality of control elements in a second group, the first and second plurality of control elements grouped according to functions in a selected one of a plurality of operating modes of the control module;
illuminating a first group of control-dividing surfaces corresponding to the first group of control elements using a first color;
illuminating a second group of control-dividing surfaces corresponding to the second group of control elements using a second color;
illuminating a plurality of different control-dividing surfaces separately;
adapting the illuminated control-dividing surface accordingly to represent a new separation of the control elements into different groups in the event an operating mode changes; and
providing an illuminated control-dividing surface between control elements within the new separation to separate one group of control elements from another group of control elements.

15. The method of claim 10 wherein the control module is an audio mixing console.

16. The method of claim 14 wherein the control module is an audio mixing console.

* * * * *